S. L. TERRY.
AUTOMOBILE LOCK.
APPLICATION FILED JAN. 22, 1917.

1,236,889.

Patented Aug. 14, 1917.

Witnesses

S. L. Terry
Inventor,
by C. A. Snow & Co.
Attorneys.

UNITED STATES PATENT OFFICE.

SAMUEL L. TERRY, OF CHICAGO, ILLINOIS.

AUTOMOBILE-LOCK.

1,236,889.  Specification of Letters Patent.  Patented Aug. 14, 1917.

Application filed January 22, 1917. Serial No. 143,740.

*To all whom it may concern:*

Be it known that I, SAMUEL L. TERRY, a citizen of the United States, residing at Chicago, in the county of Cook and State of Illinois, have invented a new and useful Automobile-Lock, of which the following is a specification.

The present invention appertains to automobile locks, and aims to provide a novel and improved device of that character.

It is the object of the invention to provide a locking appliance for the steering wheel of a motor vehicle, which is operable to release the steering wheel from the steering shaft when the automobile is left standing, in order that the vehicle cannot be successfully steered, thereby preventing theft, although the front wheels can be turned in case of fire or danger to move the vehicle.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein.

Figure 1:
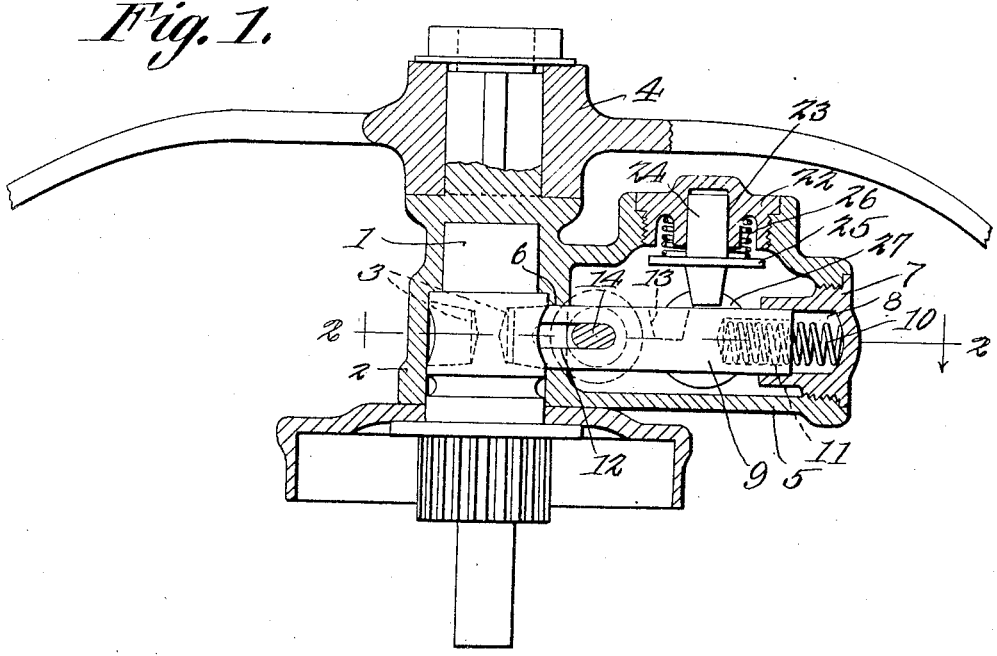
Figure 1 is a vertical section of the device taken on the line 1—1 of Fig. 2.
Figure 2:
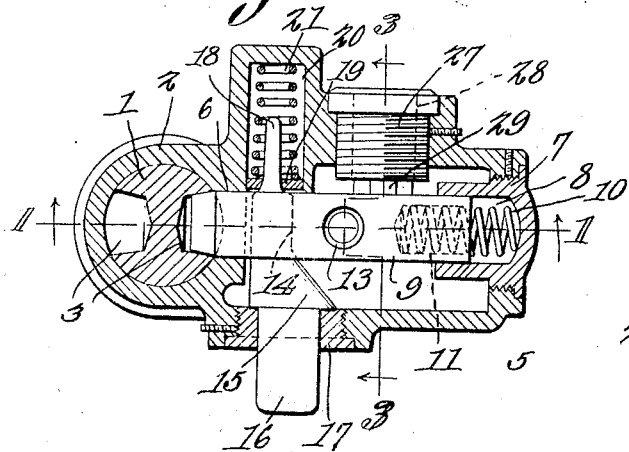
Fig. 2 is a horizontal section taken on the line 2—2 of Fig. 1.
Figure 3:
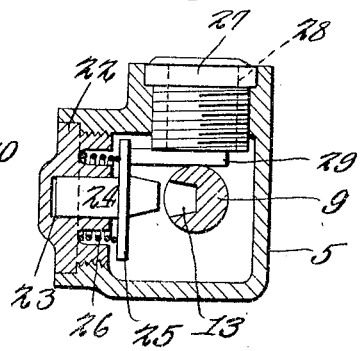
Fig. 3 is a cross section taken on the line 3—3 of Fig. 2.

In the drawing, there is illustrated a steering stem or shaft 1, of a certain make of automobile, although it is to be understood that the device can be used on other automobiles upon which a sleeve 2 is fitted, said stem being provided with a plurality of tapered recesses 3. The hub 4 of the steering wheel is secured upon the upper end of the sleeve 2.

A casing 5 is cast integral with or otherwise fastened to the sleeve 2, and said sleeve is provided with an aperture 6 extending radially from the stem at the inner end of the casing. The casing has a cap 7 at its outer end provided with a socket 8 and a lock bolt 9 is slidable within the socket 8 and aperture 6 and is provided with an inner tapered end to wedge within the recesses 3. The outer heel end of the bolt 9 has a socket 11 receiving a coiled wire expansion spring 10 which seats in the recess or socket 8 and presses the bolt 9 inwardly when released, in order that the bolt in projecting into one of the recesses 3 will lock the sleeve 2 to the stem 1, in order that the steering gear can be actuated by means of the steering wheel when running the automobile.

The bolt 9 is provided with a longitudinal slot 12 near its inner end, and is also provided with a socket 13 between its ends for holding the bolt in retracted position.

The bolt 9 is retracted by means of a plunger 14 slidable through the slot 12 at substantially right angles with the bolt 9. The plunger 14 has a cam 15 within the casing engageable with the bolt 9, in order that when the button 16 outstanding from the cam 15 is pushed, the cam will force the bolt 9 away from the stem 1, whereby to retract the bolt and thus disconnect the sleeve 2 from the stem 1, so that the steering wheel in being rotated will simply turn loosely on the stem 1 without operating the steering gear. This will prevent the theft of the car by a person not possessing the necessary key. The button 16 projects slidably through a cap 17 fastened to the casing. The inner end of the plunger 14 has a finger 18 projecting into an inner recess 20 in that side wall of the casing opposite the cap 17. A washer 19 is fitted on the finger 18 and a coiled wire expansion spring 21 surrounds the finger 18 in the recess 20 and is confined between the washer and closed end of the recess to project the plunger 14 when it is released.

A catch 24 is slidable within a recess or bore 23 with which a cap 22 secured to one side wall of the casing 5 is provided, at substantially right angles with the bolt 9. Said catch has an outstanding flange 25 and an expansion spring 26 is confined between the flange 25 and cap 22 to move the catch toward the bolt, to project into the recess or socket 12. A key operated lock 27 is fitted in one side wall of the casing 5 and has a barrel 28 adapted to be rotated by the insertion of a proper key, and this barrel is provided with a cam 29 at its inner end to contact with the flange or shoulder 25, in order that when the barrel is rotated by means of the proper key, the cam 29 in bearing upon the flange or shoulder 25 will push the catch 24 away from the bolt 9, thereby to retract the tongue from the socket 13, and permit the bolt 9 to move.

In operation, when both the plunger 14 and catch 24 are moved to releasing position, the bolt 9 will be projected into one of the recesses 3 by means of the spring 10, thereby enabling the stem 1 to be rotated by means of the steering wheel. When the car is left standing, the plunger 14 is pressed to retract the bolt 9 from the recess 3, in which event the catch 24 projects into the socket 13, thereby holding the bolt 9 in retracted position with the steering wheel released from the stem 1, so that the automobile cannot be successfully operated without the use of the proper key for turning the cam 29 and releasing the catch 24 from the bolt 9.

The caps 7, 17 and 22, and lock 27 are fastened in place so that they cannot be removed without prohibitive trouble to meddlers.

Having thus described the invention, what is claimed as new is:—

1. A device of the character described, embodying a casing, a cap carried by the casing, a lock bolt within the casing slidably engaging said cap, a second cap carried by the casing, a catch carried by the second cap engageable with the lock bolt for holding it in one position, a third cap carried by the casing, means carried by the third cap for moving the lock bolt to be engaged by the catch, and key operated means carried by the casing engageable with the catch for moving it to one position.

2. In a device of the character described, a casing, a cap carried thereby, a lock bolt within the casing slidably engaging said cap, spring means between said cap and lock bolt for projecting it, a second cap carried by the casing, a catch slidably engaging the second cap, spring means between the catch and second cap for moving it into engagement with the lock bolt, a third cap carried by the casing, a plunger slidable through the third cap and engaging the lock bolt for retracting it, and key operated means carried by the casing having means engageable with the catch for retracting it from the lock bolt.

3. In a device of the character described, the combination with a member and a member rotatable thereon, of a spring pressed lock bolt slidable in the second mentioned member and projectable into connection with the first mentioned member, said bolt having a socket, manually operated means for retracting the bolt, a spring pressed catch slidable within the second mentioned member and engageable in said socket for holding the bolt retracted, and key operated means carried by the second mentioned member having a key barrel provided with a cam engageable with the catch for moving it away from the bolt.

In testimony that I claim the foregoing as my own, I have hereto affixed my signature in the presence of two witnesses.

SAMUEL L. TERRY.

Witnesses:
CHARLES A. BILLING,
JAMES F. LANE.